US012152660B2

(12) United States Patent
Zhou et al.

(10) Patent No.: US 12,152,660 B2
(45) Date of Patent: Nov. 26, 2024

(54) COGWHEEL

(71) Applicant: Ocado Innovation Limited, Hatfield (GB)

(72) Inventors: Yongji Zhou, Hatfield (GB); Joseph Zammit, Hatfield (GB); Sean Clark, Hatfield (GB); Ben Thomas, Hatfield (GB); David Sharp, Hatfield (GB); Sergey Zhelyabovskiy, Hatfield (GB); Kris Turner, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 126 days.

(21) Appl. No.: 17/763,895

(22) PCT Filed: Sep. 25, 2020

(86) PCT No.: PCT/EP2020/076975
§ 371 (c)(1),
(2) Date: Mar. 25, 2022

(87) PCT Pub. No.: WO2021/058780
PCT Pub. Date: Apr. 1, 2021

(65) Prior Publication Data
US 2022/0341488 A1 Oct. 27, 2022

(30) Foreign Application Priority Data

Sep. 27, 2019 (GB) ..................................... 1913978

(51) Int. Cl.
*F16H 55/22* (2006.01)
*F16H 1/12* (2006.01)
(Continued)

(52) U.S. Cl.
CPC ............... *F16H 55/22* (2013.01); *F16H 1/18* (2013.01); *F16H 55/16* (2013.01); *F16H 55/26* (2013.01); *F16H 1/12* (2013.01)

(58) Field of Classification Search
CPC .......... F16H 55/22; F16H 55/26; F16H 51/00; F16H 55/16; F16H 1/12; F16H 1/18; F16H 55/0846; F16H 55/08
See application file for complete search history.

(56) References Cited

U.S. PATENT DOCUMENTS 2,845,809 A * 8/1958 Hetzel ..................... F16H 55/18
74/440
2,868,033 A * 1/1959 Gaither ................... F16H 55/18
74/411
(Continued)

FOREIGN PATENT DOCUMENTS

CN 201125999 Y 10/2008
CN 103807407 A 5/2014
(Continued)

OTHER PUBLICATIONS

Office Action issued on Aug. 25, 2023, by the Korean Patent Office in corresponding Korean Patent Application No. 10-2022-7014073, and an English Translation of the Office Action. (14 pages).
(Continued)

*Primary Examiner* — James R Bidwell
(74) *Attorney, Agent, or Firm* — Buchanan Ingersoll & Rooney PC

(57) ABSTRACT

The present disclosure provides an improved cogwheel permitting enhanced meshing of cogwheels when operating perpendicularly. Exemplary embodiments introduce a multi-cogwheel design with specific dimensions and tooth profiles to permit perpendicular engagement of cogwheels whilst permitting translation of such cogwheels.

8 Claims, 14 Drawing Sheets

(51) Int. Cl.
*F16H 1/18* (2006.01)
*F16H 55/16* (2006.01)
*F16H 55/26* (2006.01)

(56) References Cited

U.S. PATENT DOCUMENTS

| | | | | |
|---|---|---|---|---|
| 2,898,467 | A | * 8/1959 | Von Ardenne | H01J 31/121 313/461 |
| 5,181,433 | A | 1/1993 | Ueno et al. | |
| 5,964,150 | A | * 10/1999 | Kato | F16H 55/18 101/216 |
| 11,377,309 | B2 | * 7/2022 | Ingram-Tedd | B65G 54/02 |
| 2008/0211358 | A1 | 9/2008 | Borgwarth et al. | |
| 2016/0022365 | A1 | * 1/2016 | Jensen | F16H 55/0813 74/96 |
| 2020/0247611 | A1 | 8/2020 | Sharp et al. | |
| 2020/0324971 | A1 | 10/2020 | Ingram-tedd et al. | |
| 2020/0362956 | A1 | * 11/2020 | Prevost | C22C 26/00 |

FOREIGN PATENT DOCUMENTS

| | | |
|---|---|---|
| CN | 108061142 A | 5/2018 |
| DE | 102014222771 A1 | 5/2016 |
| EP | 0476802 A1 | 3/1992 |
| GB | 1210799 A | 10/1970 |
| JP | S6367463 A | 3/1988 |
| JP | H04131553 A | 5/1992 |
| JP | H10196768 A | 7/1998 |
| WO | 2008091586 A1 | 7/2008 |
| WO | 2016014694 A1 | 1/2016 |
| WO | 2019068775 A1 | 4/2019 |
| WO | 2019068778 A1 | 4/2019 |

OTHER PUBLICATIONS

International Search Report (PCT/ISA/210) and Written Opinion (PCT/ISA/237) mailed on Dec. 4, 2020, by the European Patent Office as the International Searching Authority for International Application No. PCT/EP2020/076975. (14 pages).

Office Action (Examination) issued on Nov. 28, 2020, by the Great Britain Patent Office in corresponding Great Britain Patent Application No. 2015213.8. (5 pages).

Search Report issued in corresponding Great Britain Patent Application No. 1913978.1 by the Intellectual Property Office dated Feb. 25, 2020. (4 page).

First Office Action issued on Jul. 4, 2023, by the Japanese Patent Office in corresponding Japanese Patent Application No. 2022-519196, and an English Translation of the Office Action. (9 pages).

Office Action (Examination Report No. 1) issued on Jun. 13, 2023, by the Australian Patent Office in corresponding Australian Patent Application No. 2020354528. (4 pages).

Office Action issued on May 12, 2023, by the Canadian Patent Office in corresponding Canadian Patent Application No. 3,156,013. (4 pages).

Office Action (Communication) issued on Jun. 10, 2024, by the European Patent Office in corresponding European Patent Application No. 20 785 463.9. (7 pages).

Office Action issued on May 24, 2024, by the Canadian Patent Office in corresponding Canadian Patent Application No. 3,156,013. (4 pages).

* cited by examiner

COGWHEEL

This application claims priority from UK Patent Application No. GB1913978.1 filed 27 Sep. 2019, the content of all this application hereby being incorporated by reference.

TECHNICAL FIELD

The present invention relates generally to the field of mechanical machines and more specifically to a particular cogwheel which permits two-dimensional meshing.

BACKGROUND

Cogwheels (also referred to as gears) are commonly used in the field of mechanical machines for a variety of purposes. Fundamentally, however, cogwheels are used to transmit torque in a variety of directions. Cogwheels comprise teeth (also referred to as cogs) which mesh with another toothed part (such as another cogwheel or a linear toothed part called a rack). Such devices may be used to change the speed, torque and/or direction of a power source. When a cogwheel is used with a rack a translation is produced rather than a rotation.

A particularly interesting case is the translation of power from a first axis to a second axis, perpendicular to the first axis. In static cases, in which the cogwheels are not required to translate, worm drives and bevel drives are commonly used to transfer the power through 90 degrees. However, such devices are unable to operate where the cogwheels are also required to translate whilst remaining engaged with another toothed part.

One way to solve this problem is to use helical cogwheels as shown in FIG. 1. In FIG. 1, a first helical cogwheel 11 is meshed with a second helical cogwheel 12. In this regard, the first helical cogwheel 11 is able to rotate and use the rotation to propel itself in a particular direction when the second helical cogwheel 12 is braked to prevent it moving. In this way, a corresponding track comprising the second helical cogwheel 12 is able to facilitate the translation of the first cogwheel 11. In helical cogwheels, tooth traces are slanted which makes them stronger than spur gears and produce less noise because of higher meshing ratios than spur gears. Helical gears are typically used for power transmission.

However, the use of helical cogwheels is disadvantageous because the effect of the first helical cogwheel 11 rotating on the second helical cogwheel 12 results in an axial force on the second helical cogwheel 12. Such an axial force requires the use of thrust bearings which adds to design complexity. Moreover, axial forces mean that cogwheels attempt to move both upwards and across. One solution is to rotate the first helical cogwheel 11 in a clockwise direction whilst rotating the second helical cogwheel 12 in an anti-clockwise direction which thereby cancels out the unwanted force.

However, this solution requires the use of racks of particular tooth patterns to match the direction of rotation of the cogwheel i.e. clockwise or anti-clockwise racks. This means that a balance of forces is possible in one direction of travel only.

As shown in FIG. 2, a device 30 comprising a plurality of helical cogwheels is provided on a rack 33 and arranged to translate across the rack 33 by way of rotation of one or more helical cogwheels. In particular, the device 30 comprises a first helical cogwheel 31 and a second helical cogwheel 32. It will be noted that the first and second helical cogwheels 31 and 32 are of opposing rotation direction. However, the rack 33 is provided such that is permits either wheel to rotate at any point on the face thereof and effect translation. As can be seen, this feature requires the racks be provided with cuts for both clockwise and anti-clockwise spirals, but the extra cuts reduce the contact area between the cogwheel 31 and the rack 33 thereby reducing the force transfer. In particular, the gaps in the rack 33 highlight the low contact area between each helical cogwheel 31 and the rack 33.

This restricts the placement of helical cogwheels on the device 30 in order to maintain sufficient contact with the rack 33 resulting in undesirable compromises in the design of such devices 30.

There is therefore a need for an improved engagement mechanism between cogwheels and racks/other cogwheels.

SUMMARY

In view of the problems in known cogwheel design, the present invention aims to provide an improved cogwheel permitting the enhanced meshing of cogwheels when operating perpendicularly.

In general terms, the invention introduces a multi-cogwheel design with specific dimensions and tooth profiles to permit perpendicular engagement of cogwheels whilst permitting translation of such cogwheels.

According to the present invention there is provided a cogwheel comprising a first cogwheel part comprising a plurality of teeth and a second cogwheel part comprising a same number of teeth as the first cogwheel part. The second cogwheel part is arranged axially spaced apart from the first cogwheel part, the second cogwheel part has substantially the same circular pitch as the first cogwheel part, each tooth of the second cogwheel part is offset in a rotational direction by half the circular pitch relative to the first cogwheel part, a face width of the first cogwheel part is substantially half the circular pitch of the first cogwheel part, and a face width of the second cogwheel part is substantially half the circular pitch of the second cogwheel part.

The present invention further provides a rack for use with a cogwheel as previously described, the rack comprising a first part comprising a plurality of teeth and a second part comprising a same number of teeth as the first cogwheel part. The second part is arranged laterally spaced apart from the first part, each tooth of the second part is offset in a longitudinal direction by substantially half a pitch relative to the first part, a face width of the first part is substantially half the pitch of the first part, and a face width of the second part is substantially half the pitch of the second part.

The present invention further provides a transporting device arranged to cooperate with at least one other transporting device in a cluster with a reconfigurable physical topology, the transporting device comprising an item receiving space and a relocating unit arranged to permit relocation of the transporting device within the cluster by way of interaction with the at least one other transporting device. The relocating unit is the cogwheel as previously described.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 3:
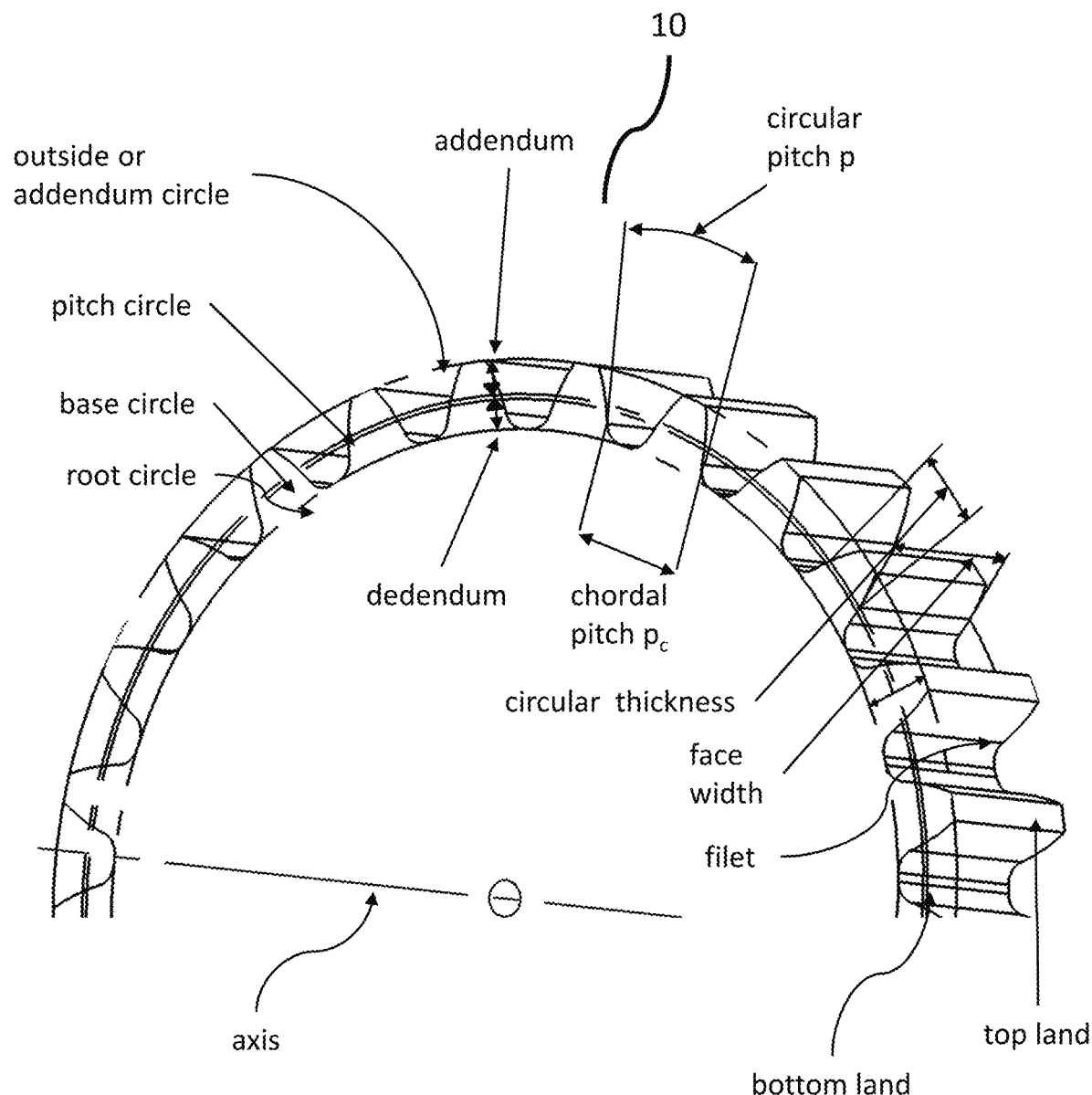
FIG. 3 is a diagram of standard nomenclature useful for understanding the principals of cogwheel formation.

FIG. 3 shows an example section of a standard spur gear i.e. straight cut cogwheel. A brief description will be provided of relevant terms, however, many other terms exist in the art relating to other particular dimensions of cogwheels.

With reference to FIG. 3, the cogwheel 10 is shown marked with various dimensions which are defined as:

Number of Teeth, N
  How many teeth a gear has, an integer.
Path of Contact
  Path followed by the point of contact between two meshing gear teeth.
Line of Action, Pressure Line
  Line along which the force between two meshing gear teeth is directed. It has the same direction as the force vector. In general, the line of action changes from moment to moment during the period of engagement of a pair of teeth. For involute gears, however, the tooth-to-tooth force is always directed along the same line—that is, the line of action is constant. This implies that for involute gears the path of contact is also a straight line, coincident with the line of action—as is indeed the case.
Axis
  Axis of revolution of the gear; centre line of the shaft.
Pitch Point
  Point where the line of action crosses a line joining the two gear axes.
Pitch Circle, Pitch Line
  Circle centred on and perpendicular to the axis, and passing through the pitch point. A predefined diametral position on the gear where the circular tooth thickness, pressure angle and helix angles are defined.
  A pitch circle (operating) is the curve of intersection of a pitch surface of revolution and a plane of rotation. It is the imaginary circle that rolls without slipping with a pitch circle of a mating gear.
  These are the outlines of mating gears. Many important measurements are taken on and from this circle.
Addendum, a
  Radial distance from the pitch surface to the outermost point of the tooth.

$$a=(D_o-D)/2$$

Dedendum, b
  Radial distance from the depth of the tooth trough to the pitch surface.

$$b=(D-\text{root diameter})/2$$

Circular Pitch, p
  Distance from one face of a tooth to the corresponding face of an adjacent tooth on the same gear, measured along the pitch circle.
Module or Modulus, m
  Since it is impractical to calculate circular pitch with irrational numbers, mechanical engineers usually use a scaling factor that replaces it with a regular value instead. This is known as the module or modulus of the wheel and is simply defined as $$m=p/\pi$$

Modulus may be also expressed in terms of number of teeth, N and pitch diameter (corresponding to the pitch circle) of the cogwheel, d. In particular:

$$m=d/N$$

Pressure Angle, θ
  The complement of the angle between the direction that the teeth exert force on each other, and the line joining the centres of the two gears. For involute gears, the teeth always exert force along the line of action, which, for involute gears, is a straight line; and thus, for involute gears, the pressure angle is constant.
Root Diameter
  Diameter of the gear, measured at the base of the tooth.
Base Circle
  In involute gears, the tooth profile is generated by the involute of the base circle. The radius of the base circle is somewhat smaller than that of the pitch circle
Circular Thickness
  Length of arc between the two sides of a gear tooth, on the specified datum circle.
Face Width
  The face width of a gear is the length of teeth in an axial plane. For double helical, it does not include the gap.
Pitch
  Pitch is the distance between a point on one tooth and the corresponding point on an adjacent tooth. It is a dimension measured along a line or curve in the transverse, normal, or axial directions. The use of the single word pitch without qualification may be ambiguous, and for this reason it is preferable to use specific designations such as transverse circular pitch, normal base pitch, axial pitch.
Bottom Land
  The bottom land is the surface at the bottom of a gear tooth space adjoining the fillet.
Top Land Top land is the (sometimes flat) surface of the top of a gear tooth.

Clearance Distance between the root circle of a gear and the addendum circle of its mate.

Figure 4:
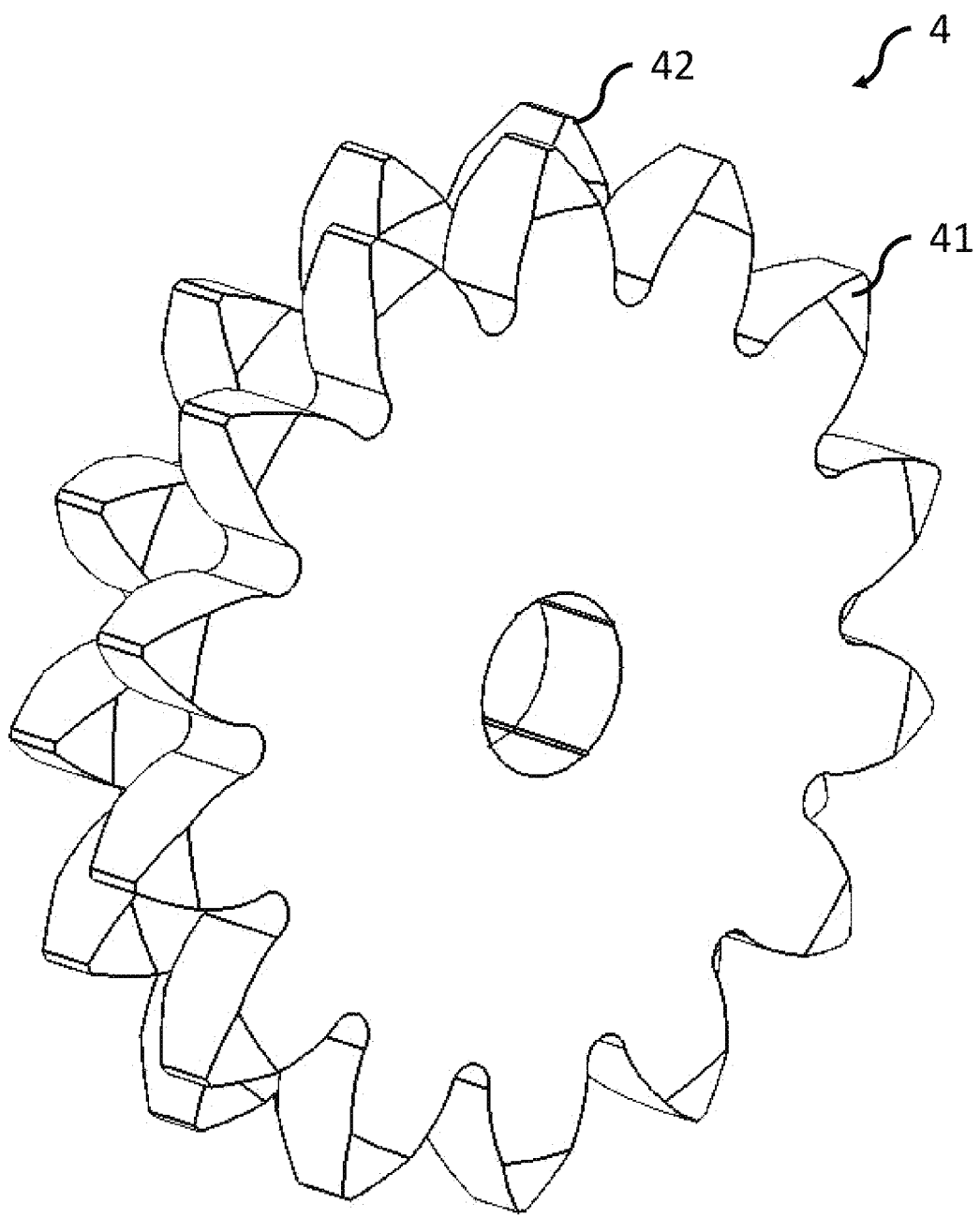
FIG. 4 is a diagram of a cogwheel according to a first embodiment of the present invention.

FIG. 4 shows a cogwheel 4 according to the first embodiment of the present invention. The cogwheel 4 is designed for use with other cogwheels 4 of a similar design so that effective meshing is achieved when the axes of the cogwheels are arranged perpendicular to one another. In this way, the cogwheels are able to translate across each other effectively using the surface of the other cogwheels as a rack to permit translation. Moreover, the cogwheel 4 is designed for use with racks to permit translation of the cogwheel across the surface of the rack in either a longitudinal or lateral direction i.e. directions perpendicular to each other.

To achieve this, the cogwheel 4 comprises a first cogwheel part 41 and a second cogwheel part 42. Each cogwheel part is formed of features usually found on a cogwheel, namely, equally spaced apart teeth of a consistent tooth profile. In this regard, each cogwheel part is substantially identical but the orientation of the cogwheel parts differs relative to other cogwheel parts.

Although FIG. 4 shows two cogwheel parts it is envisaged that more than two cogwheel parts may be formed in a single cogwheel 4. For example, as will be described later, five cogwheel parts may be formed together to provide particular advantages.

In more detail, the first cogwheel part 41 and second cogwheel part 42 may be integrally formed. To achieve its functions, the arrangement of the second cogwheel part 42 is carefully chosen relative to the first cogwheel part 41. The second cogwheel part 42 and the first cogwheel part 41 are axially mounted so that they rotate on the same axle. Moreover, the second cogwheel part 42 is arranged axially spaced apart from the first cogwheel part 41. The cogwheel parts may be arranged directly adjacent to one another in an axial direction, as shown in FIG. 4.

In particular, the second cogwheel part 42 is positioned axially adjacent to the first cogwheel part 41. Moreover, the second cogwheel part 42 is furthermore rotated about the common axis such that the addendums of the first cogwheel part 41 are substantially aligned with the dedendums of the second cogwheel part 42 when viewed axially. As shown in FIG. 4, each tooth of the second cogwheel part 42 is rotationally offset by half a tooth relative to the first cogwheel part 41 which permits a second cogwheel (not shown) to translate perpendicular to the direction of rotation of the first cogwheel 4. In this way, the first cogwheel 4 may be set up to mimic a rack for a second cogwheel (not shown) moving perpendicularly across it (i.e. in the axial direction of the first cogwheel 4).

As seen in FIG. 4, the first cogwheel part 41 and the second cogwheel part 42 have the same number of teeth on their respective parts. Moreover, each cogwheel part is of substantially the same diameter. Accordingly, the circular pitch is substantially the same between the cogwheel parts.

With regard to the rotational offset of the second cogwheel part 42 with respect to the first cogwheel part 41, this offset is arranged such that teeth of the second cogwheel part 42 are precisely misaligned with the teeth of the first cogwheel part 41. In other words, the teeth of the second cogwheel part 42 are arranged rotationally offset with respect to the first cogwheel part 41 by a distance substantially equal to half the circular pitch. In this way, the middle of the top land of each tooth of the second cogwheel part 42 aligns with the middle of each bottom land on the first cogwheel part 41.

Moreover, the face width of each of the first cogwheel part 41 and second cogwheel part 42 is selected to be substantially equal and to be of a distance to permit the perpendicular meshing of two cogwheels 4 according to the first embodiment of the present invention. To achieve this, the face width of each cogwheel part is selected to be equal to half the circular pitch. As explained previously, each of the cogwheel parts is selected to have substantially the same circular pitch. Expressed in an alternative manner, the face width of each tooth is substantially equal to half the modulus multiplied by pi.

As explained in the definitions previously, the circular thickness is the arc length between edges of a tooth. For equally spaced teeth, the circular thickness is equal to half the circular pitch. Therefore, the face width of each tooth on the cogwheel parts is expected to be substantially equal to the circular thickness i.e. each tooth is substantially as wide as it is deep (when viewed axially).

Figure 5:
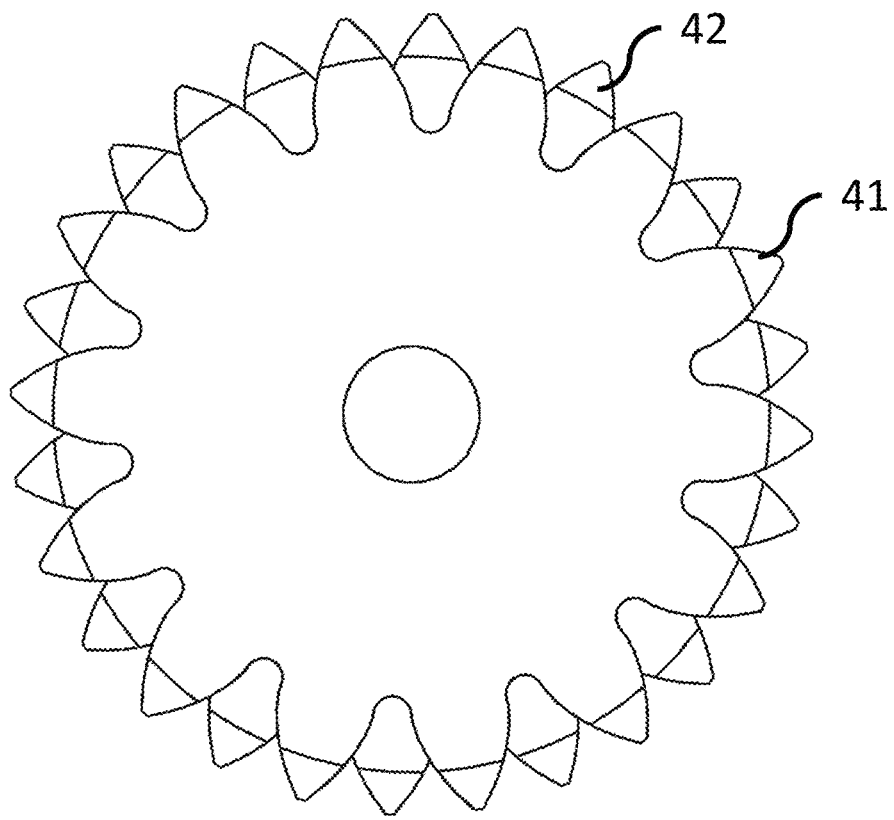
FIG. 5 is a diagram of an axial view of a cogwheel according to the first embodiment of the present invention together with detailed imagery of the tooth profile.
Figure 5:
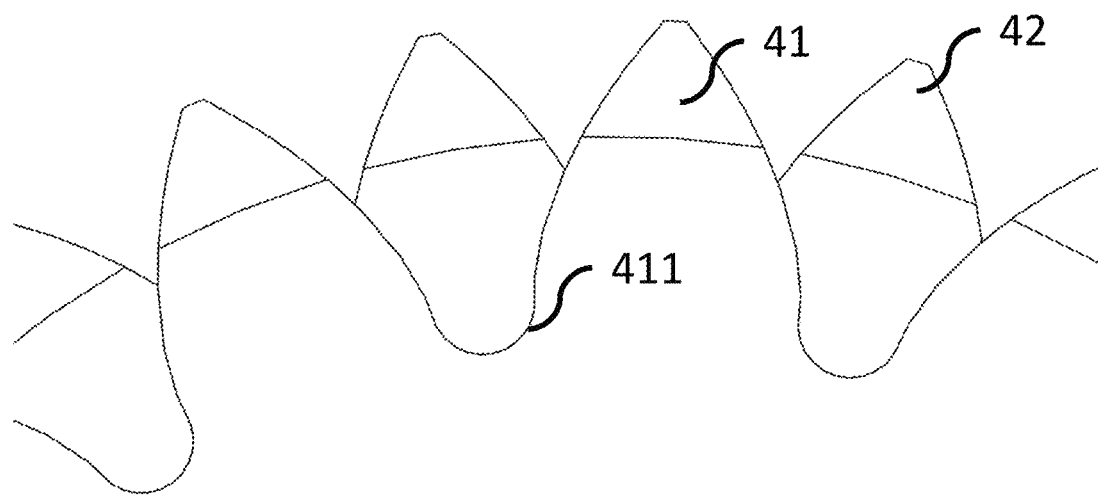

FIG. 5 shows a view of the cogwheel 4 in an axial direction. As shown, the first cogwheel part 41 and the second cogwheel part 42 are aligned such that tops of teeth line up with the middle of bottom lands and vice-versa. In this way, the sides of the teeth are able to handle axial loads without sliding as would be the case for two spur gears meshing at 90 degrees and similarly for rack and pinion systems.

FIG. 5 also shows in more detail the tooth profile from an axial direction for the teeth of the cogwheel 4. In particular, it was found that an involute tooth profile was most beneficial to the functioning of the cogwheel 4. In this way, the behaviour of the cogwheel 4 most closely mimics that of rack and pinion systems. As seen in FIG. 5 the teeth arranged radially are each of an involute gear profile. The involute equation is defined as:

$$x=a(\cos(t)+t^*\sin(t))$$

$$y=a(\sin(t)-t^*\cos(t))$$

with a circle centre (0,0) and radius a, the curve starts at (a,0).

As shown in FIG. 5, each tooth may feature a root clearance 411 to enhance the smooth movement of a corresponding cogwheel when operating on the cogwheel shown in FIG. 5.

Figure 6:
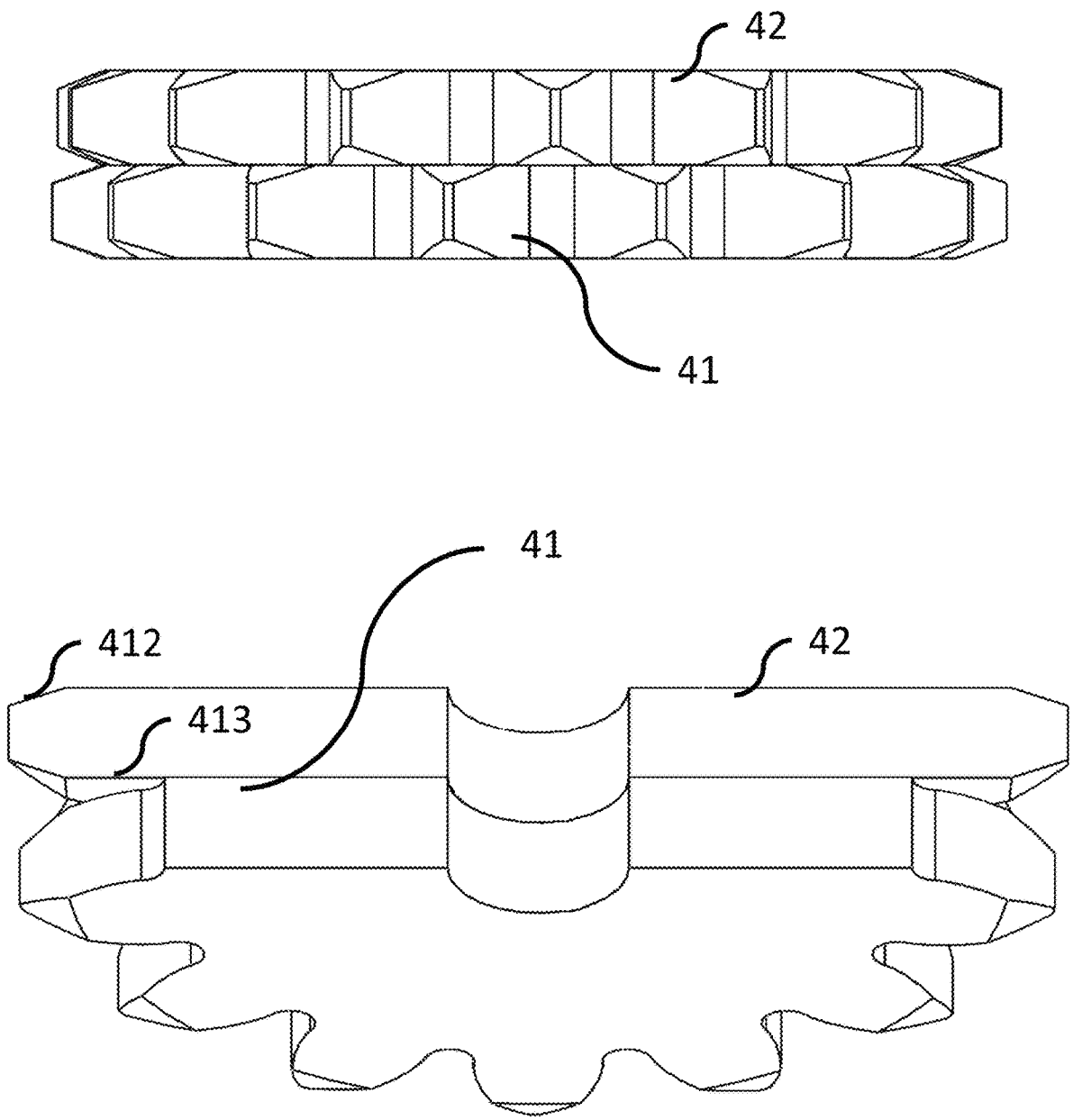
FIG. 6 is a diagram of a radial view of a cogwheel according to the first embodiment of the present invention together with detailed imagery of the tooth profile.

FIG. 6 shows a view of the cogwheel 4 in a radial direction, Moreover, a view of the tooth profile is also shown. As can be seen, the tooth profile from this view is different to that shown in FIG. 5. Therefore, the cogwheel 4 comprises asymmetry between axial and radial tooth profiles. In particular, the tooth profile chosen in the axial direction is so chosen to permit effective engagement in an axially perpendicular direction.

More specifically, the tooth profile seen when viewing the cogwheel 4 radially was chosen to differ from the involute profile used when viewing the cogwheel axially. The tooth profile as shown in FIG. 6 is substantially rectangular in profile (which differs from the involute shape seen when viewing the cogwheel 4 in an axial direction). Moreover, root clearance is not provided in the direction of FIG. 6. Instead, the root clearance provided by dedendums present when viewing the cogwheel 4 axially is sufficient to permit smooth motion for a cogwheel 4 meshing at 90 degrees without the necessity to form additional/more traditional root clearance. In this way, the teeth closely mimics the profile of traditional rack and pinion systems so that a second cogwheel moving across the teeth experiences smooth motion. By not requiring further root clearance in the axial direction, the contact area between teeth is maximised.

It was further found that by providing a clearance 412 (also known as a relief) towards the tip of each tooth form when viewing the cogwheel 4 in the radial direction improved performance could be achieved. In particular a tapered tip of each tooth was found to ease engagement of teeth from a cogwheel meshing at 90 degrees. In this regard, the addendum of each tooth was formed akin to a rack when viewed in profile so that a second cogwheel 4 operating perpendicularly to a first cogwheel will roll smoothly. In this way, the tooth profile resembles that of the involute rack profile without the semi-circular root clearance typically provided (because appropriate root clearance is already provided in the perpendicular axis).

In this way, continuous contact and force transfer is successfully provided both with the cogwheel 4 rotating on a rack, and when a second cogwheel 4 rotates axially perpendicular to a first cogwheel 4.

Figure 1:
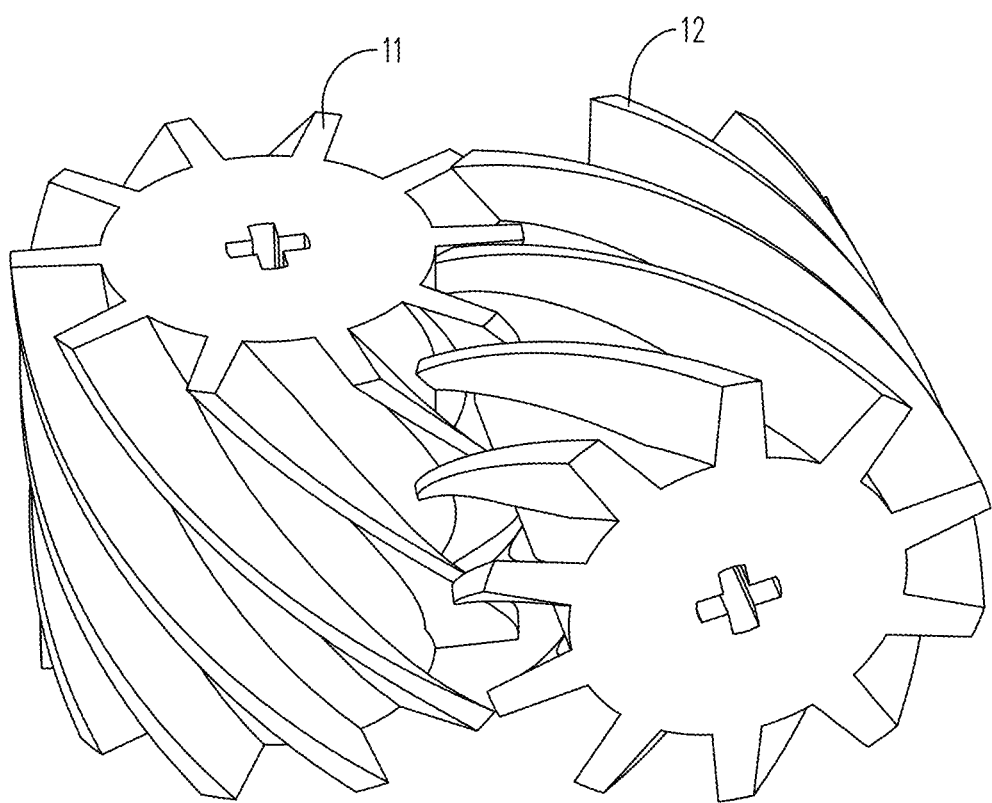
FIG. 1 is a diagram of the perpendicular engagement of two helical cogwheels according to a known system.
Figure 2:
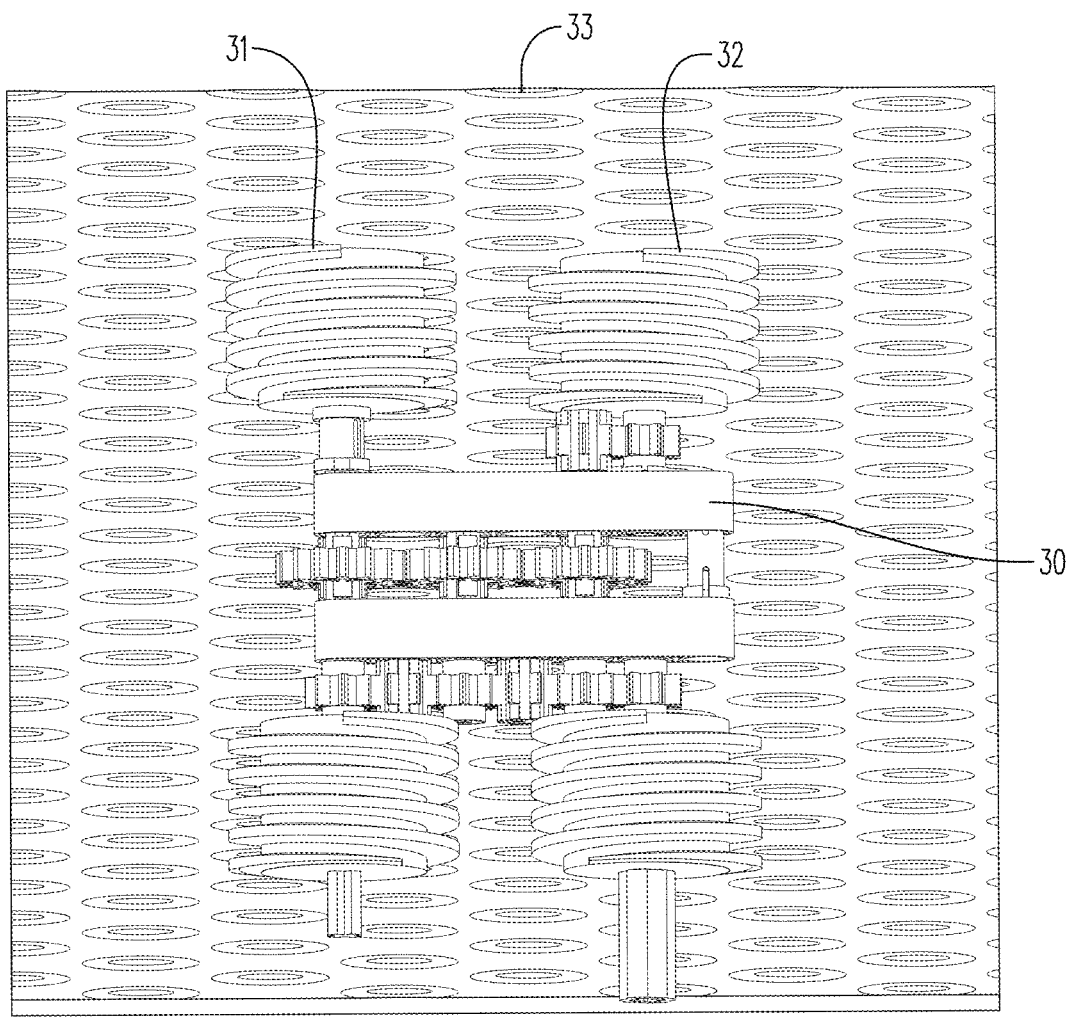
FIG. 2 is a diagram showing the use of helical cogwheels on a rack to permit the translation of a device on the rack.

The cogwheel 4 of the first embodiment was found to provide greatly improved performance as compared to helical gears. In particular, the cogwheel 4 does not suffer from the undesirable forces present in directions other than the direction of travel. Moreover, when used with a rack, the rack used does not suffer from the large gaps as shown in FIG. 2.

A cogwheel 4 according to the first embodiment does not experience, when being traversed in a perpendicular direction by another cogwheel 4, any rotational force, i.e. it experiences no force in the direction tangential to its circumference. This removes any complexity in counteracting unwanted forces.

Optionally, a fillet may be increased in size at the root of each tooth when viewing the cogwheel in a radial direction. In this way, the relatively abrupt lower portion of the tooth profile 413 may be smoothed in the root thereof. This increases the contact area providing improved force transfer.

Figure 7:
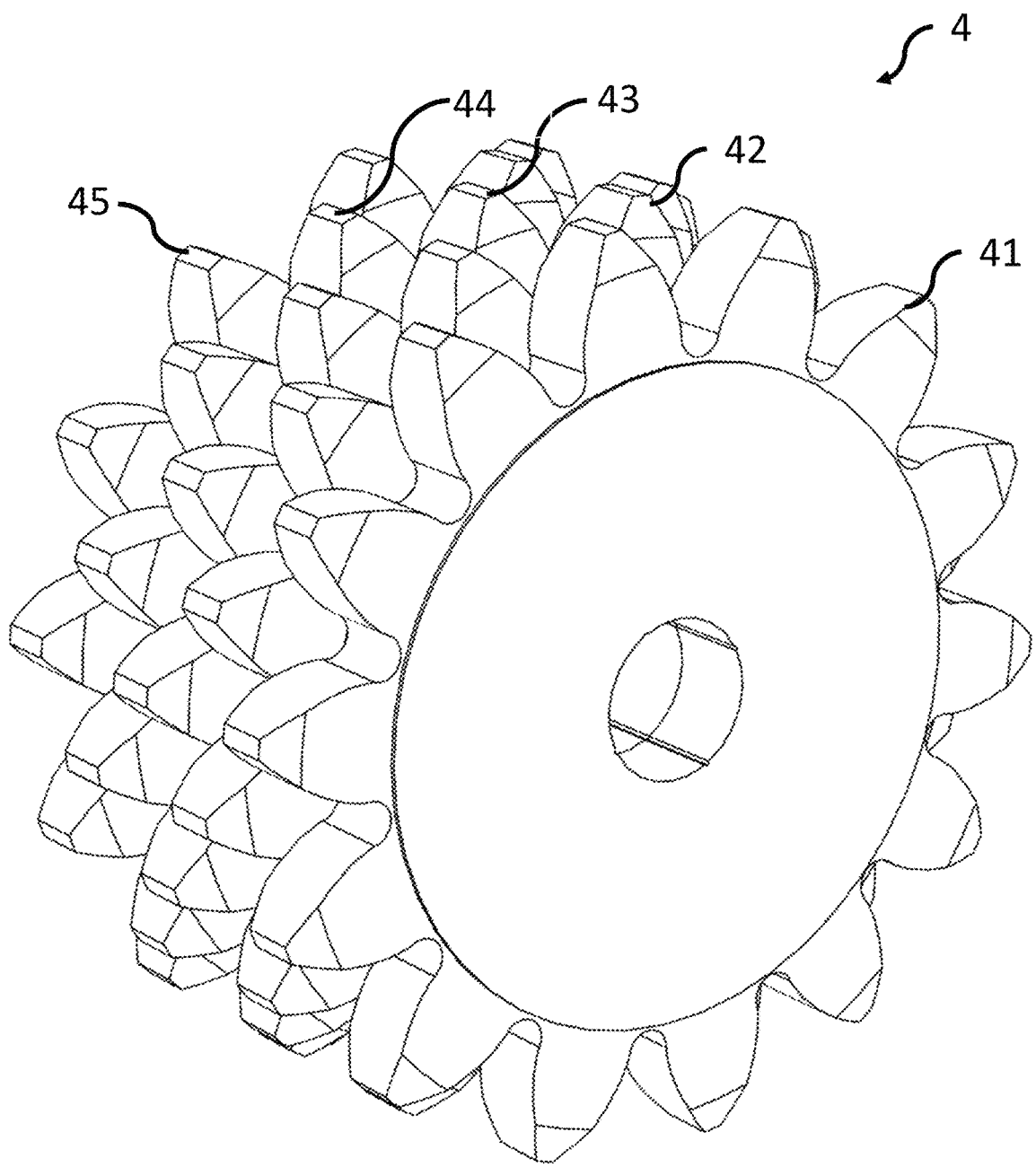
FIG. 7 is a diagram of a modified cogwheel according to the first embodiment of the present invention.

FIG. 7 shows an example of a cogwheel 4 comprising more than two cogwheel parts. In particular, the cogwheel 4 shown in FIG. 7 comprises five cogwheel parts 41-45 which provides improved force transfer when meshing with a rack or equivalent cogwheel 4. As explained previously, each cogwheel part 41-45 comprises identical numbers of teeth, and each are of substantially the same diameter thereby resulting is a substantially similar circular pitch. As with the cogwheel 4 shown in FIG. 4, each cogwheel part is offset in the rotational axis relative to the cogwheel part which preceded it—namely by half the circular pitch. For example, the second cogwheel part 42 is arranged offset by a half circular pitch in the rotational direction as compared to the first cogwheel part 41. Similarly, the third cogwheel part 43 is arranged offset by a half circular pitch in the rotational direction as compared to the second cogwheel part 42. As a result, the third cogwheel part 43 and the first cogwheel part 41 are aligned rotationally on the axis. Similarly, the fourth cogwheel part 44 and the second cogwheel part 42 are also aligned rotationally. Similarly, the fifth cogwheel part 45, the first cogwheel part 41 and the third cogwheel parts 43 are also aligned rotationally.

Moreover, the face width of each of the first to fifth cogwheel parts 41-45 are substantially the same, being half the circular pitch of the cogwheel 4 when viewed from an axial direction. In this way, the cogwheel 4 is arranged to provide an equivalent rack in the axial direction for efficient traversal by a cogwheel 4 rotating perpendicularly.

Figure 8:
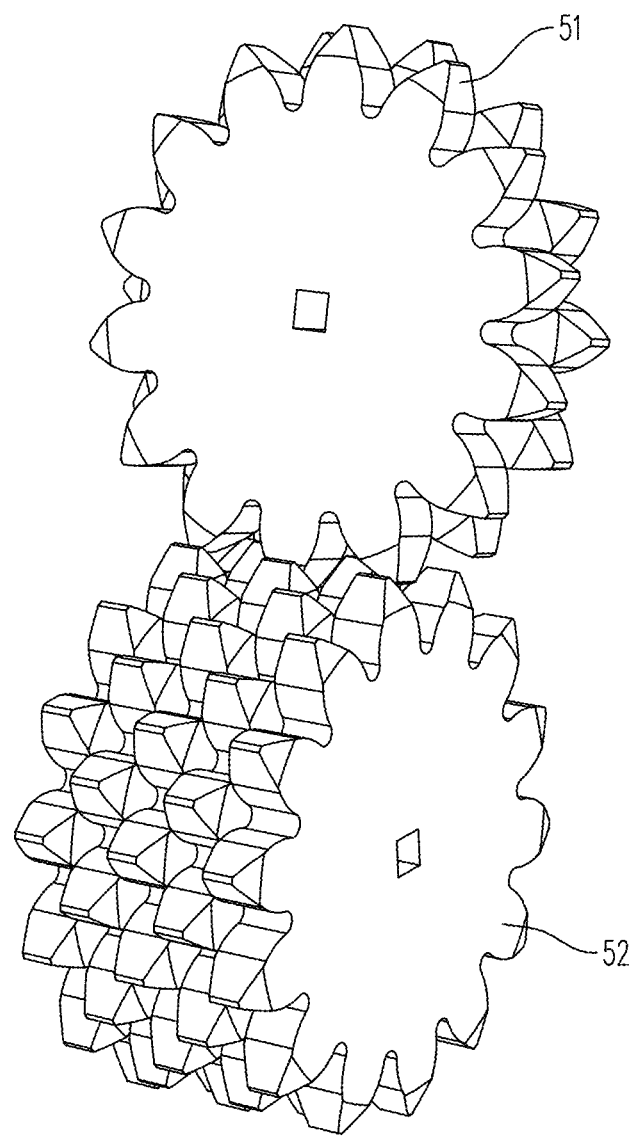
FIG. 8 is a diagram of the meshing of two cogwheels according to the first embodiment of the present invention.
Figure 9:
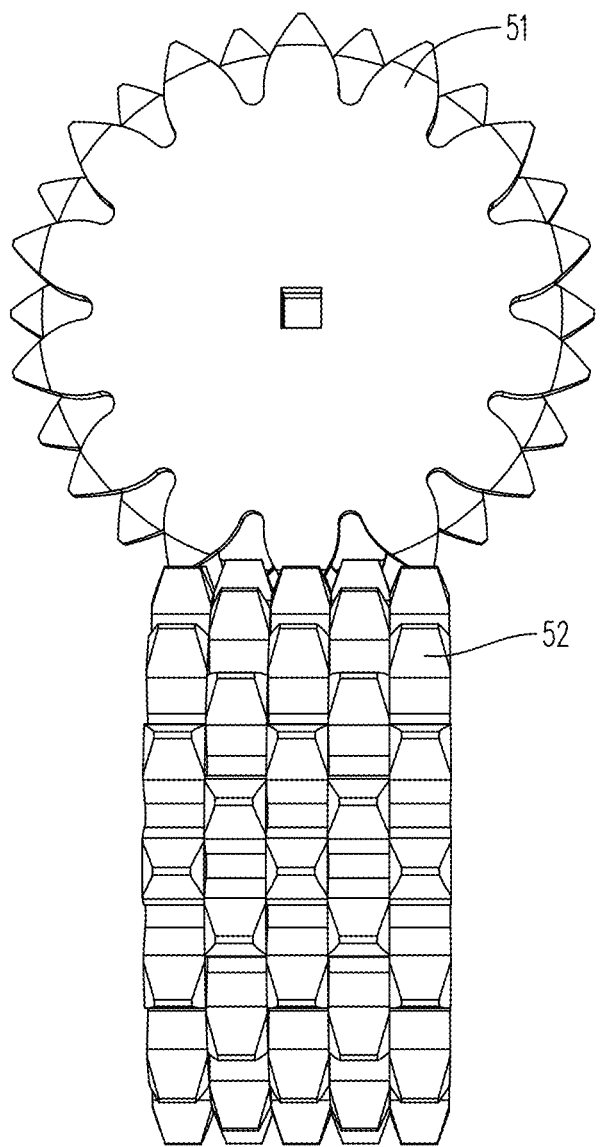
FIG. 9 is a diagram showing an axial view of a first cogwheel meshing with a second cogwheel, each cogwheel being according to the first embodiment of the present invention.
Figure 10:
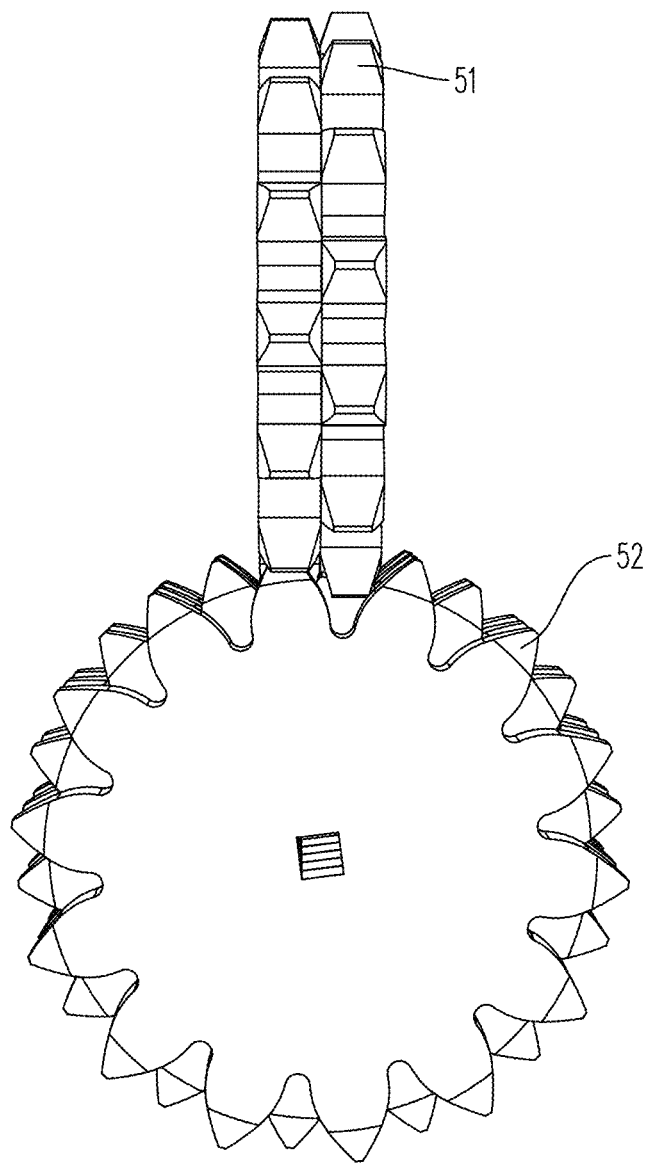
FIG. 10 is a diagram showing a radial view of a first cogwheel meshing with a second cogwheel, each cogwheel being according to the first embodiment of the present invention.

FIGS. 8-10 provide diagrams of the envisaged meshing of two cogwheels 4 according to the first embodiment of the present invention. In this example, it will be explained as a first cogwheel 51 rotating over a second wheel 52 which is to remain stationary. In this way, the second wheel 52 will provide the rack upon which the first cogwheel 51 will rotate. It is expected that the axis of the first cogwheel 51 will move laterally as a result of its rotation. On the other hand, no rotation or translation of the second cogwheel 52 is envisaged in this example.

More specifically, FIG. 8 shows the scenario of a first cogwheel 51 meshing at 90 degrees with a second cogwheel 52. As can be seen, the tooth profile seen when viewing the first cogwheel 51 axially is engaging with the tooth profile seen when viewing the second cogwheel 52 radially. Therefore, the tooth profile of the second cogwheel 52 which is constructed to most closely resemble that of a standard rack is being employed for the translation of the first cogwheel 51.

FIG. 9 shows the meshing from a direction in line with the axis of rotation of the first cogwheel 51 which is perpendicular to the axis of rotation of the second cogwheel 52. In the diagram of FIG. 9, the first cogwheel 51 may move from left to right relative to the page, whilst the second cogwheel 52 remains stationary. As can be seen, the involute tooth profile of the first cogwheel 51 (as seen in its axial direction) is engaging with the straighter, but with a tapered addendum, tooth profile of the second cogwheel 52 (as seen in its radial direction).

FIG. 10 shows a further diagram this time with the first cogwheel 51 moving into or out of the page, i.e. towards or away from the viewer. In this view, the second cogwheel 52 is shown in axial direction highlighting its involute tooth profile. Although in this example, the second cogwheel 52 is being held stationary, each cogwheel is effectively interchangeable i.e. both possess the appropriate axial and radial tooth profiles described previously, then the first cogwheel 51 could be held stationary whilst the second cogwheel 52 was driven to effect translation. A particular advantage of the cogwheel 4 according to the first embodiment is the ability of a stationary wheel to provide a rack for other cogwheels 4 but also able to be powered and thereby translate over a rack and over other cogwheels 4.

Figure 11:
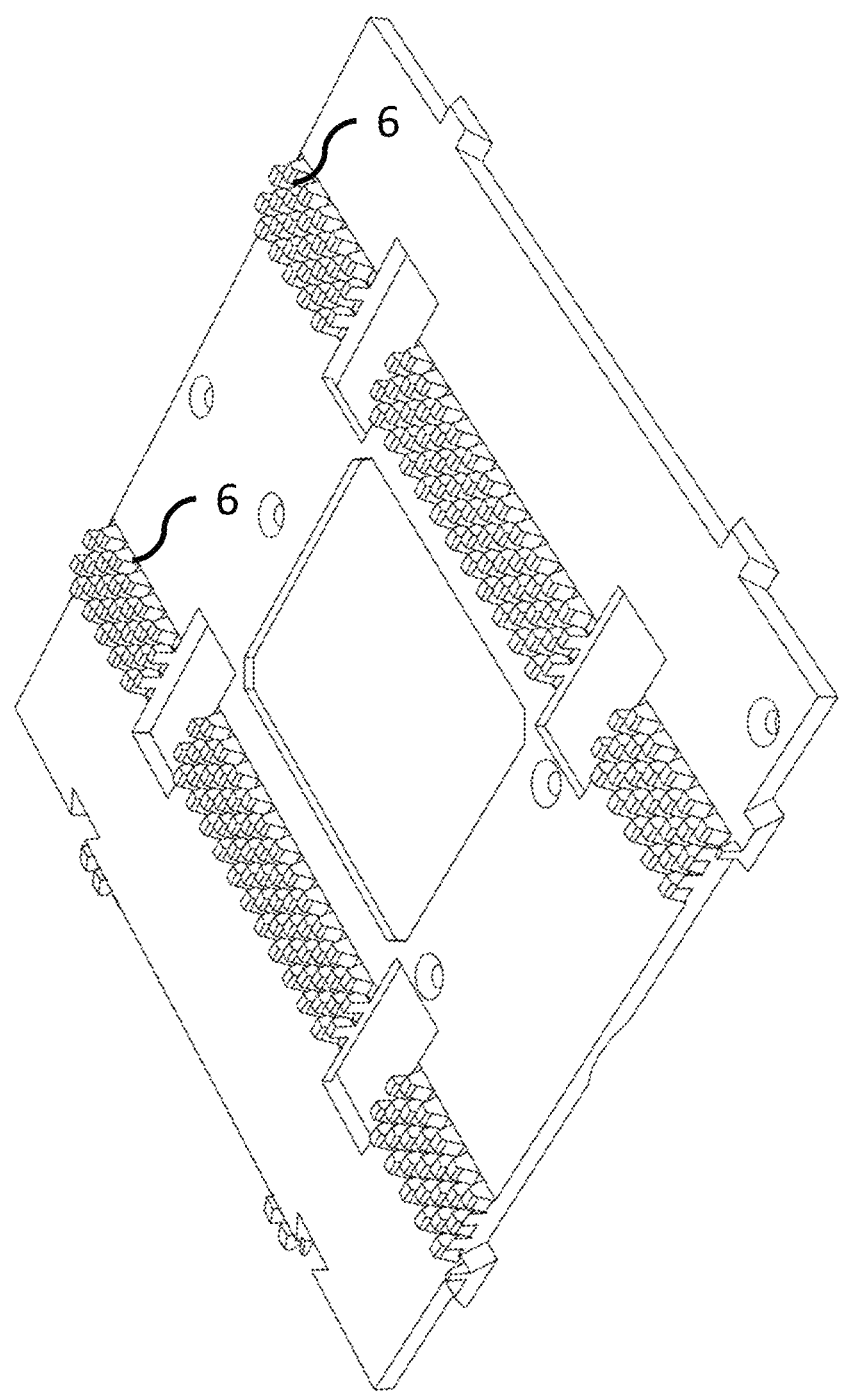
FIG. 11 is a diagram showing a rack according to the first embodiment of the present invention.

FIG. 11 shows a corresponding rack 6 arranged for use with the cogwheel 4 of the first embodiment of the present invention. In this example, the rack is shown on a panel of a transporting device, the use of which will be described later. As can be seen, the rack 6 has a particular arrangement of teeth which is dissimilar from existing racks. This is provided so as to engage with the cogwheel 4.

In particular, the rack 6 is formed from at least two parts, each comprising a plurality of teeth. A first part and a second part are arranged adjacent to each other. The pitch may be measured as the distance from the start of one tooth to the start of the next tooth on the rack 6. Therefore, the pitch consists of the tooth form and a trough. The second part is offset longitudinally from the first part by half the pitch. In this way, the middle of each tooth in the second part is substantially aligned with the middle of the trough in the first part.

Moreover, the face width (i.e. thickness of each tooth) in the first part and the second part is substantially the same. Moreover, the face width of the first part and the second part is substantially half the pitch. In this way, a cogwheel 4 may move longitudinally or laterally across the rack 6 without impediment.

It is envisaged, that the tooth profile of the rack 6 may be optimised for operation with the cogwheel 4. For example, the relatively straight tooth profile used in the cogwheel 4 viewed from an axial direction may be used in both the longitudinal and lateral axes of the rack 6. However, other tooth profiles may be used. For example, the tooth profile used in the rack 6 is envisaged to include that found on racks typically used with cogwheels featuring an involute tooth profile.

Optionally, a fillet may be increased in size at the root of each tooth in the lateral direction. In this way, the relatively abrupt lower portion of the tooth profile may be smoothed in the lateral direction at the root thereof. This increases the contact area providing improved force transfer.

The rack shown in FIG. 11 is shown with five parts in each rack, i.e. five rows of teeth arranged laterally on the rack. In this way, the cogwheel 4 shown in FIG. 7 may be used on the rack. However, any number of parts may be used. The use of multiple rows of teeth allow for a wider face width on the rack allowing for more force transfer compared with fewer rows but with the same total width.

Figure 12:
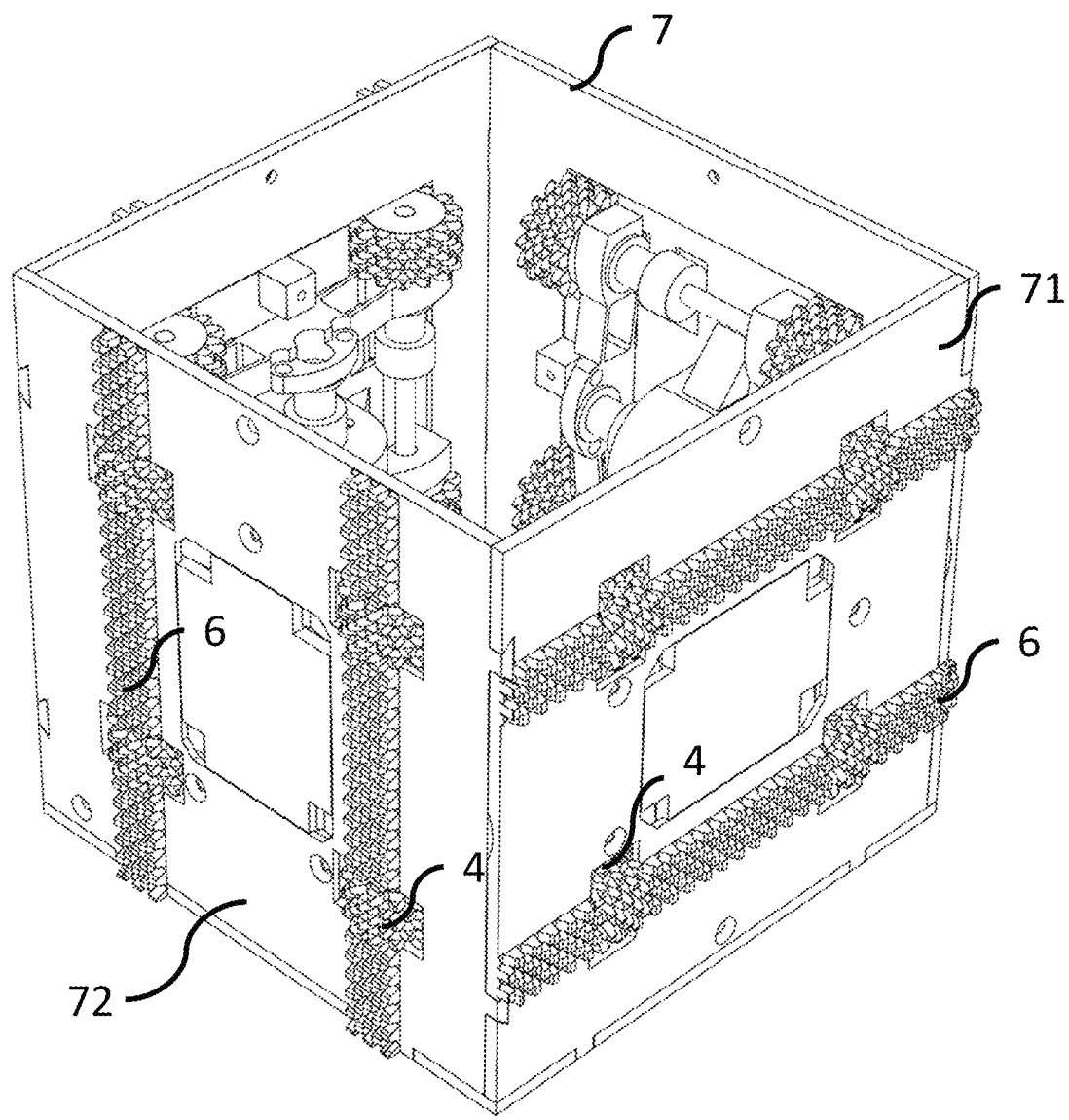
FIG. 12 shows a transporting device comprising a rack and cogwheel according to the first embodiment of the present invention.
Figure 13:
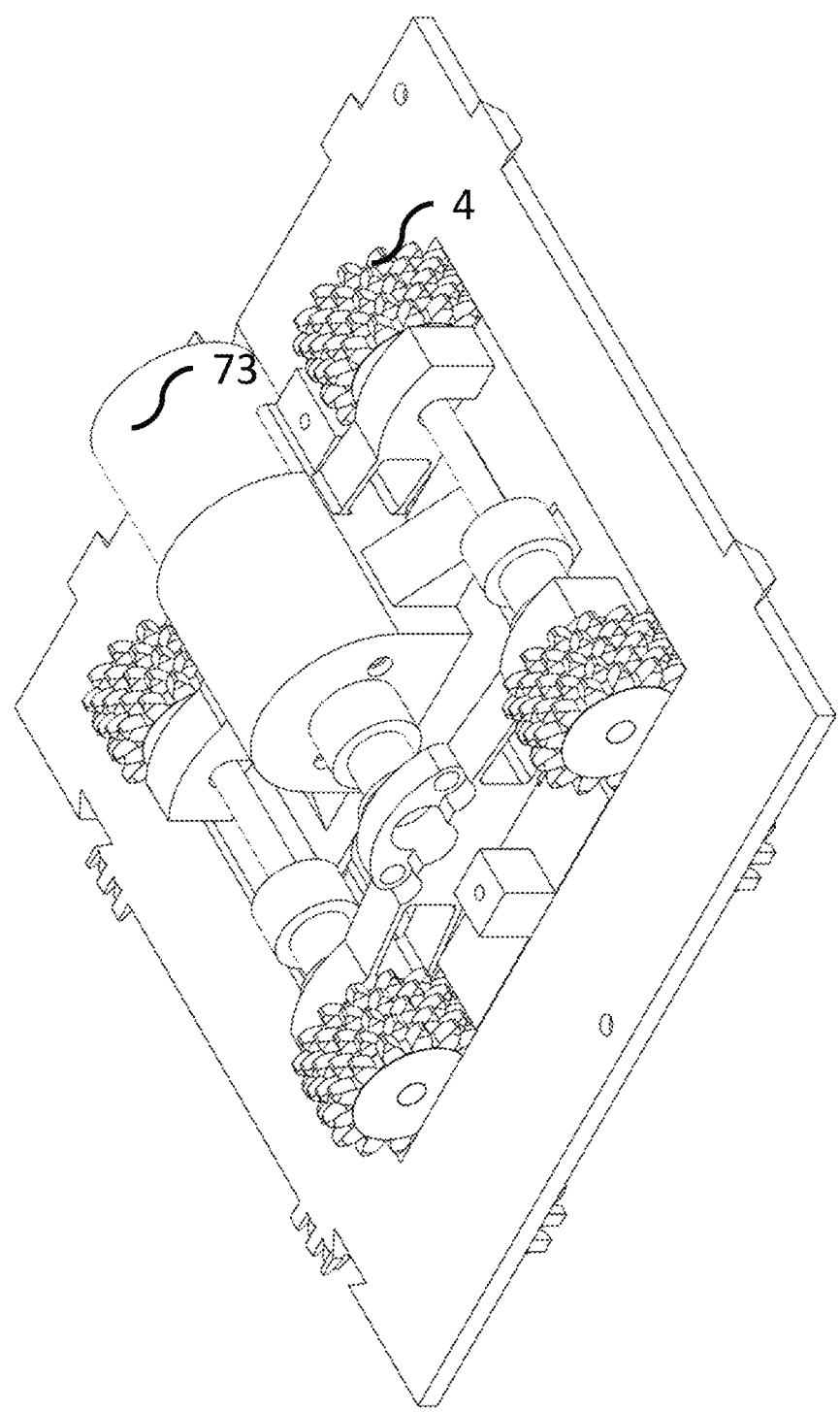
FIG. 13 shows a face of a transporting device comprising a cogwheel according to the first embodiment of the present invention and its drive arrangement.
Figure 14:
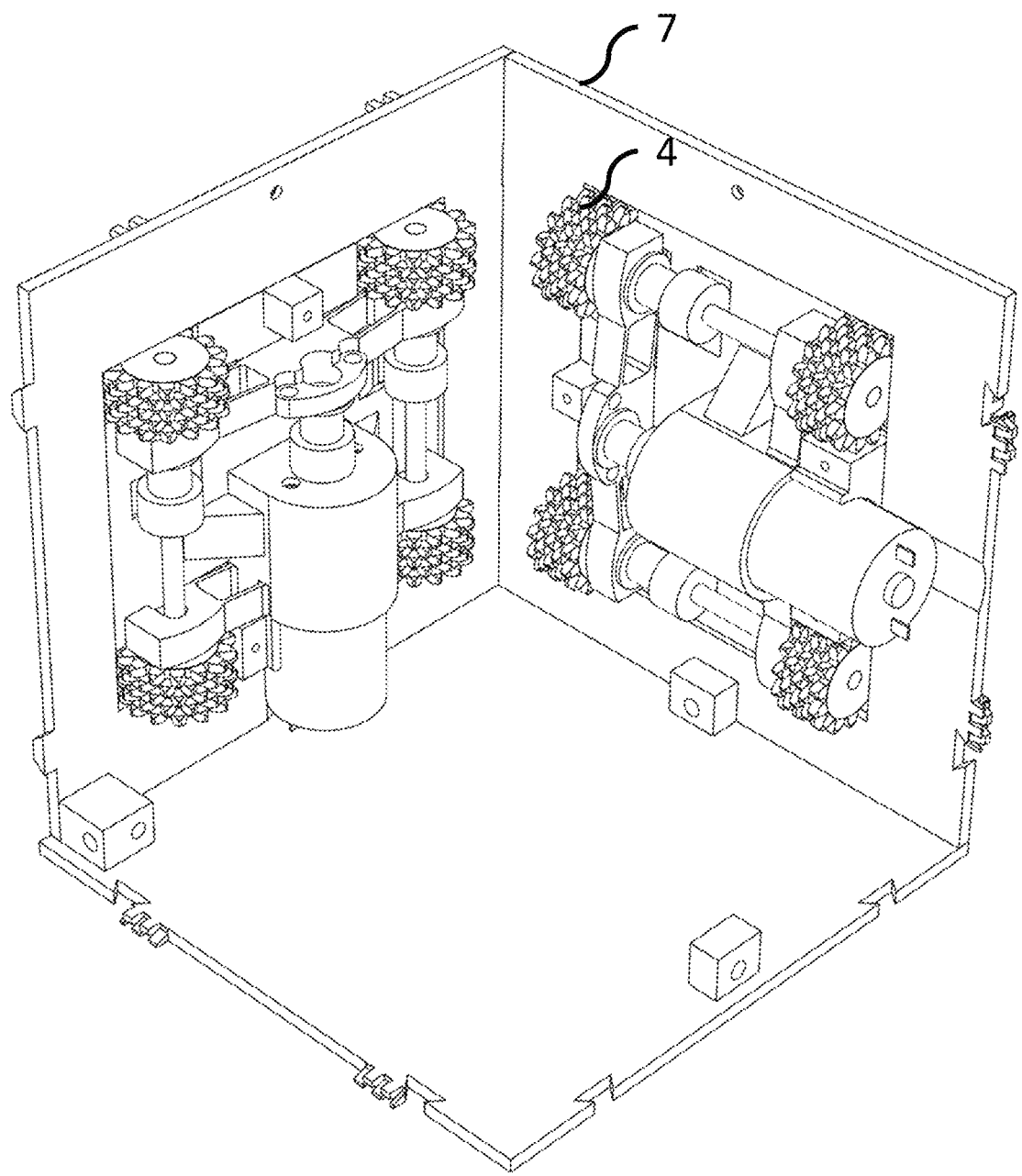
FIG. 14 shows a cut-away section of a transporting device comprising a cogwheel according to the first embodiment of the present invention.

FIGS. 12-14 show a transporting device 7 and components thereof arranged to operate in a cluster of other transporting devices 7. The concept of such transporting devices is addressed in Ocado Innovation Limited UK Patent Application No. GB1716204.1 filed on 4 Oct. 2017 and re-filed as PCT/EP2018/076928 (published as WO2019068775A1) on 3 Oct. 2018 (Ocado Innovation Limited Reference Numbers 000113 GB and 000113WO respectively), the content of both of these applications hereby being incorporated by reference. In summary, these applications disclose the use of a transporting device 7 arranged to cooperate with at least one other transporting device in a cluster with a reconfigurable physical topology. The transporting device comprising an item receiving space and a relocating unit arranged to permit relocation of the transporting device within the cluster by way of interaction with the at least one other transporting device.

A particular problem faced by such transporting devices 7 is the need to translate transporting devices 7 around a cluster of transporting devices 7. To achieve this, each transporting device 7 comprises four active faces which comprise mechanisms to translate the transporting device 7. In this way, each face can use interactions with a corresponding face on a neighbouring transporting device 7 to permit movement in three dimensions. Previous examples of mechanisms include magnetic mechanisms using electromagnets and the like to move transporting devices 7 in the cluster. However, these may be hard to control and are relatively expensive.

However, by employing the cogwheel 4 of the first embodiment of the present invention together with the rack of the first embodiment of the present invention previous problems regarding cost and control can be eliminated.

As seen in FIG. 12 a first face 71 and a second face 72 of the transporting device 7 are shown. The first face 71 comprises two racks 6 arranged horizontally across the face with gaps therein for cogwheels 4 arranged in a vertical orientation i.e. with their axis of rotation extending horizontally across the face. Such a face interacts with a corresponding second face 72 which would be located on a neighbouring transporting device 7 in the cluster. The second face 72 (which is also installed perpendicular to the first face 71 on the transporting device 7 shown in FIG. 12) comprises two racks 6 arranged vertically on the face together with cogwheels 4 arranged such that their axis of rotation is vertical and therefore the wheel is generally positioned horizontally. The interaction of the first face 71 and the second face 72 will naturally lead to the meshing of two cogwheels 4 at 90 degrees to each other as described previously. However, due to the innovative design of the cogwheels 4 as described previously then by holding one cogwheel 4 stationary then the meshing cogwheel 4 can be made to move and translate across the stationary cogwheel 4 and then engage with rack 6 on either side of the cogwheel 4. In this way, efficient two dimensional translation can be achieved.

By considering the diameter of each cogwheel part, width thereof, number of teeth etc. an efficient meshing can be made for cogwheels moving perpendicularly. For the cogwheel 4 to move over another cogwheel 4 smoothly and without interference with the rack on either side, the cogwheel 4 it moves over must either be wide enough or the moving cogwheel 4 must curve away quickly enough (smaller radius) to ensure the teeth of the moving cogwheel 4 do not come into contact with the rack 6.

FIG. 13 shows an example of the mounting mechanism for four cogwheels 4 on a face of the transporting device 7. In the example, a single motor 73 may be used to drive the cogwheels 4 together with axles and a drivetrain to transfer the motive power to each of the cogwheels 4. Spring sections may be included in such a structure (by way of compliant mechanisms or the like) to ensure correct meshing of the cogwheel 4 by using spring tension to keep each cogwheel 4 in contact with another cogwheel 4 or a rack 6.

FIG. 14 shows a cutaway view inside a transporting device 7 showing how a face tessellates with another face in a single transporting device 7.

With regard to control of individual transporting devices 7 within the cluster, the face interacts with a transporting device 7 and/or a stack of transporting devices 7. Such control strategies are addressed in Ocado Innovation Limited UK Patent Application No. GB1716201.7 filed on 4 Oct. 2017 and refiled as PCT/EP2018/076933 (published as WO2019068778A1) on 3 Oct. 2018 (Ocado Innovation Limited Reference Numbers 000164 GB and 000164WO respectively), the content of all of these applications hereby being incorporated by reference. In this cross-referenced document transporting device 7 is referred to as a transporting vessel and it is envisaged that such terms may be used interchangeably.

Modifications and Variations

Many modifications and variations can be made to the embodiments described above, without departing from the scope of the present invention.

The cogwheel 4 may be made of any manner of materials suitable to resist deformation. For example, the cogwheel 4 and/or the rack 6 may be made from plastic, metal, wood or composites depending on the particular application. In one particular example, the cogwheel 4 and/or rack 6 may be made from metal, and then magnetised. In this way, the cogwheel 4 and rack 6 may be made to attract to one another. In this way, when applied to the transporting device 7, the transporting devices 7 would not fall apart and provide good traction with no slipping without a more complicated wheel design due to the magnetic attraction.

As an alternative to magnetic attraction, electrostatic attraction could instead be applied to the cogwheel 4 and/or the rack 6. For example, this approach would work particularly well for cogwheels 4 and/or racks 6 formed from plastic.

In another example, the cogwheel 4 may be arranged to be provided with a communications transfer mechanism and/or electrical power transfer mechanism. In this way, electronics provided within the body of the cogwheel 4 may be supplied with electrical power and/or communications means. For examples, a sensing unit (e.g. to measure rotation of the cogwheel 4 such as with a tilt sensor) may be provided within the cogwheel 4 may be provided with power and also to transfer information therefore by way of the communications transfer mechanism and the electrical power transfer mechanism. To achieve this the cogwheel 4 may be provided with a slip ring to make contact with at least one brush to transfer power/communications from a rotating cogwheel 4.

Although FIG. 12 depicts the wheel 4 and rack 6 implemented on a transporting device 7, the scope is not limited to such a device only. In particular, cogwheels 4 may be attached to a base of a transporting device 7 and racks 6 installed on a floor and/or a top lip/edge of a transporting device 7 below. In this way, transporting devices 7 can be made to move in X/Y directions without any other transporting devices 7 on the same Z level (vertical level).

Although FIG. 12 shows one possible arrangement of cogwheels 4 and racks 6, others are envisaged. For example, more wheels 4 and racks 6 may be added to each transporting device 7. This may allow vertical motion not just in the fully aligned position with the adjacent transporting devices 7, but half way onto one transporting device 7 and half way onto another. In this way, transporting devices 7 of differing dimensions may interact with one another.

The cogwheels 4 described herein may be formed into belt with the same tooth profiling exposed and able to interact with adjacent transporting devices 7. In other words, to form caterpillar tracks of cogwheels 4. This would provide greater contact between transporting devices 7 and if transporting devices 7 were covered in many of caterpillar tracks this would allow transporting devices 7 to move in more positions relative to their neighbours than just the fully aligned positions.

The cogwheel 4 described previously is shown with the same number of teeth on each cogwheel part 41 and 42, the module of the teeth is the same between cogwheel parts 41 and 42 and rack 6, the cogwheel parts 41 and 42 have the same radius, adjacent cogwheel parts 41 and 42 are offset by exactly half circular pitch in the rotational direction, and cogwheel parts 41 and 42 are of the same width. It is envisaged that each of these parameters may be modified, for example, by varying the number of teeth and still apply the inventive concept disclosed herein.

More specifically, each cogwheel part 41 and 42 may have a different number of teeth, the teeth each cogwheel part 41 and 42 and the corresponding parts of the rack 6 may be of a different module, the cogwheel parts 41 and 42 need not have the same radius, adjacent cogwheel parts 41 and 42 may be offset by an amount greater or less than half circular pitch in the rotational direction, and cogwheel parts 41 and 42 need not be of the same width. The chamfers and reliefs made to the cogwheel parts 41 and 42, and to the rack 6, may be adapted to provide the appropriate clearance for the cogwheels 4 and racks 6 to operate as intended, whilst allowing sufficient force transfer. It is envisaged that not all configurations will be effective, but for the purposes of material optimisation, or in order to realise the advantages of multiple configurations in one system, such modifications to the cogwheels 4 and racks 6 may prove useful provided sufficient force transfer is attainable for the application concerned.

Additionally, the cogwheel parts 41 and 42 need not be placed exactly adjacent axially so as to mate, and that other spacings of cogwheel parts 41 and 42 in the axial direction may be permissible given appropriate modifications to the corresponding racks 6.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A cogwheel comprising:
a first cogwheel part having a plurality of teeth; and
a second cogwheel part having a same number of teeth as the first cogwheel part,
wherein:
the second cogwheel part is arranged axially spaced apart from the first cogwheel part,
the second cogwheel part has substantially a same circular pitch as the first cogwheel part,
each tooth of the second cogwheel part is offset in a rotational direction by half the circular pitch relative to the first cogwheel part, and
a face width of the first cogwheel part and a face width of the second cogwheel part are substantially half the circular pitch to permit perpendicular engagement of two of the cogwheel.

2. The cogwheel according to claim 1, comprising:
a third cogwheel part having a same number of teeth as the second cogwheel part,
wherein:
the third cogwheel part is arranged axially spaced apart from the second cogwheel part,
the third cogwheel part has a same circular pitch as the second cogwheel part,
each tooth of the third cogwheel part is offset in a rotational direction by half the circular pitch relative to the second cogwheel part, and
a face width of the third cogwheel part is half the circular pitch.

3. The cogwheel according to claim 2, comprising:
a fourth cogwheel part having a same number of teeth as the third cogwheel part,
wherein:
the fourth cogwheel part is arranged axially spaced apart from the third cogwheel part,
the fourth cogwheel part has a same circular pitch as the third cogwheel part,
each tooth of the fourth cogwheel part is offset in a rotational direction by half the circular pitch relative to the third cogwheel part, and
a face width of the fourth cogwheel part is half the circular pitch.

4. The cogwheel according to claim 3, comprising:
a fifth cogwheel part having a same number of teeth as the fourth cogwheel part,
wherein:
the fifth cogwheel part is arranged axially spaced apart from the fourth cogwheel part,
the fifth cogwheel part has a same circular pitch as the fourth cogwheel part,
each tooth of the fifth cogwheel part is offset in a rotational direction by half the circular pitch relative to the fourth cogwheel part, and
a face width of the fifth cogwheel part is half the circular pitch.

5. The cogwheel according to claim 1, wherein each tooth has an involute gear profile when viewed in an axial direction.

6. The cogwheel according to claim 1, wherein each tooth is relieved at an addendum when viewed in a radial direction.

7. A rack configured for use with a cogwheel according to claim 1, the rack comprising:
- a first part having a plurality of teeth; and
- a second part having a same number of teeth as the first part, wherein:
- the second part is arranged laterally spaced apart from the first part,
- each tooth of the second part is offset in a longitudinal direction by half a pitch relative to the first part, and
- a face width of the first part and a face width of the second part are substantially half the pitch.

8. A transporting device configured and arranged to cooperate with at least one other transporting device in a cluster with a reconfigurable physical topology, the transporting device comprising:
- an item receiving space; and
- a relocating unit arranged to permit relocation of the transporting device within the cluster by way of interaction with the at least one other transporting device, wherein the relocating unit is configured to include a cogwheel including:
- a first cogwheel part having a plurality of teeth; and
- a second cogwheel part having a same number of teeth as the first cogwheel part, wherein:
- the second cogwheel part is arranged axially spaced apart from the first cogwheel part,
- the second cogwheel part has a same circular pitch as the first cogwheel part,
- each tooth of the second cogwheel part is offset in a rotational direction by half the circular pitch relative to the first cogwheel part, and
- a face width of the first cogwheel part and a face width of the second cogwheel part are substantially half the circular pitch to permit perpendicular engagement of two of the cogwheel.

* * * * *